Figure 1:
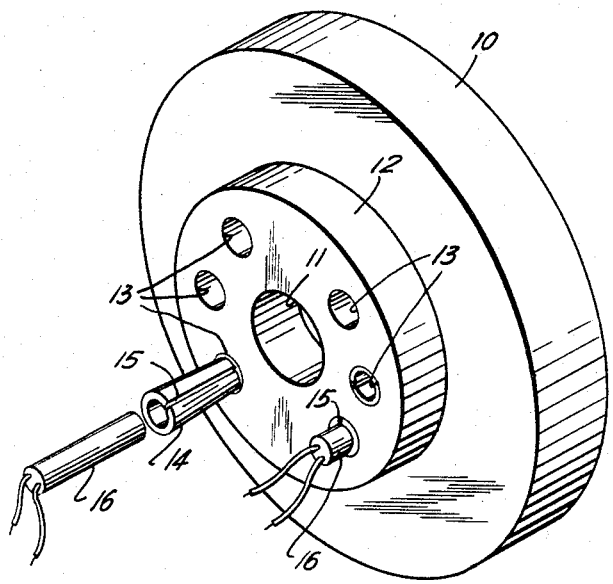

Nov. 19, 1968   J. F. McELLIGOTT   3,412,231
EXTRUSION DIE INCLUDING ELECTRICAL CARTRIDGE HEATERS
Filed March 29, 1966

INVENTOR.
JOHN F. Mc. ELLIGOTT
BY
ATTORNEY

United States Patent Office 3,412,231
Patented Nov. 19, 1968

3,412,231
EXTRUSION DIE INCLUDING ELECTRICAL CARTRIDGE HEATERS
John F. McElligott, Birmingham, Ala., assignor to International Paper Company, New York, N.Y., a corporation of New York
Filed Mar. 29, 1966, Ser. No. 538,323
7 Claims. (Cl. 219—201)

This invention relates to an improvement in a sheet or film-forming apparatus which is employed in the extrusion of organic materials such as polyolefins, cellulose derivatives, resins. synthetic rubber, rubber derivatives, and linear condensation polymers. More particularly, it relates to a new and useful bushing adapted for use with a cartridge heater in the header flange of an extruder.

Broadly speaking, the type of apparatus here involved is shown in U.S. Pat. No. 2,982,995, issued May 9, 1961, and such apparatus is comprised of a hopper for the material to be extruded (e.g., pellets of polyethylene or the like), a screw conveyor for transporting such material under pressure to the hollow central portion or header of an extrusion die, such extrusion die, and a slot in the die which is in communication with the header and through which the material is forced in the form of a film. Commonly, the die includes an annular flange about that end of the header which is connected to the screw conveyor and such flange, which is comprised of a relatively large mass of metal, is provided with means to seat a plurality of heated elements, e.g., electrical cartridges heaters, adapted to elevate the temperature of the flange and die and the material passing therethrough on its way to becoming a film or sheet. It is not uncommon to employ, for instance, six 600 watt cartridge heaters in this way, particularly when it is sought to extrude films of low or medium density polyethylene of the types referred to in U.S. Pat. No. 3,161,560, issued Dec. 15, 1964.

It is essential that cartridge heaters of the type just discussed fit snugly in holes bored to close tolerance for their reception in the header flange, so that all the heat generated by the heaters be transmitted to the surrounding metal of the flange. If tight metal-to-metal contact between the heaters and the means defining such holes does not exist, the heat will not be conducted away from the heaters swifty enough and they will overheat and burn out. Such burn-outs lead, of course, to wasteful machine down-time. They also necessitate difficult removals of the burned-out heaters from the header flange, i.e., removals requiring the use of little short of punishing brute force since the heaters must be driven out with hammers and chisels or punches and, more likely than not, undesirable scoring of the holes in the flange. Such scoring is particularly undesirable because it militates against the achievement of close fits in the holes when the burned-out heaters are replaced with new ones, especially new heaters not exactly as large as those originally employed or furnished with the flanged extrusion die. And reaming the holes to remove the scoring is not the entire answer, since it may be undesirable for other reasons to employ larger cartridge heaters in the thus-enlarged holes.

It has now been found that tight fits between header flange holes and heating elements to be inserted therein can be assured, and an unwanted, ever-quickening progression of heater burn-outs, hole-enlargements, and heater burn-outs can be substantially slowed, by a combination of simple expedients. These expedients include forming tapered holes in the header flange of the extrusion neck, placing the heater cartridges inside heat-conductive compressible tapered bushings, and driving the cartridge-containing bushings into the tapered holes until the bushings fit snugly in them and the bushings tightly hold the cartridges in place.

Figure 2:
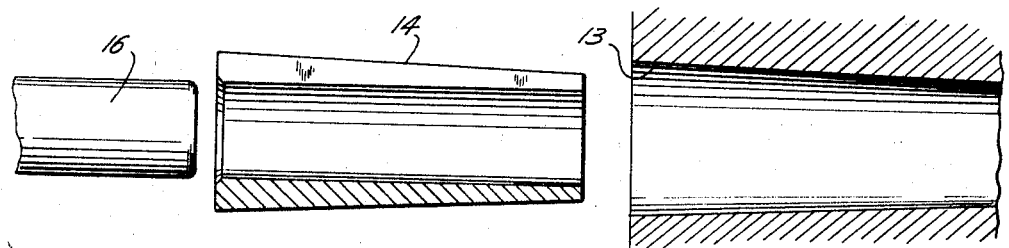
Figure 3:
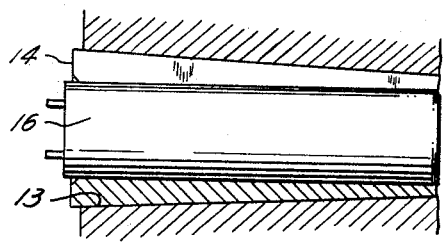

For a better understanding of the present invention, reference should be had to the attached drawing wherein
FIGURE 1 is an isometric view of the improvement of the present invention;
FIGURE 2 is a side view of portions of FIGURE 1;
FIGURE 3 is a second side view of portions of FIGURE 1; and,
FIGURE 4 is an end view of a single component of the improvement of FIGURE 1.

FIGURE 1 discloses the end 10 of an extrusion head flange having a hollow central portion or header 11. An annular protrusion 12 surrounds the end of header 11 which is depicted and is mounted upon end 10 of the extrusion head flange. Both the die and the flange are of a metal capable of conducting heat. Means define a plurality of holes 13 in header flange 12. FIGURES 2 and 3 make clear that holes 13 are tapered, with their wider ends open to viewing in FIGURE. 1.

Figure 4:
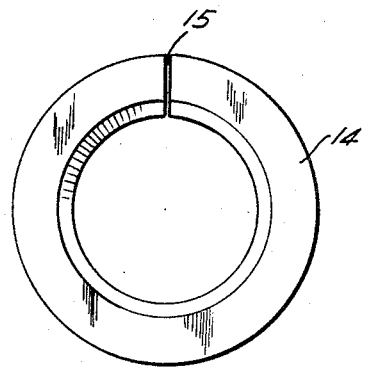

FIGURES 1 to 4 depict annular or hollow bushings 14 which, like holes 13, are tapered. These bushings too are of a heat-conductive material and their outer dimensions, when unconfined, are greater than the hole dimensions, though not so much greater as to prohibit the disposition of the bushings within the holes in due course. In short, the dimensions of the bushings 14 are adapted to secure a tight fit in the holes when the bushings are employed as intended or, otherwise expressed, and keeping in mind what has gone before herein, the holes can be deemed undersized with respect to the bushings. FIGURES 1 and 4 show, in addition, means defining a longitudinal slot 15 in the tapered wall of bushings 14. Such slot is dimensioned to permit a compression of the bushing when it is urged into undersized hole 13, but not such a degree of compression as will negate the provision of an undersized hole to secure a tight fit with the bushing.

FIGURES 1, 2, and 3 show heating elements (i.e., cylindrical electrical heater cartridges from which wires are seen to protrude) 16 before, during, and after their disposition snugly within bushings 14 and bushings 14 before, during, and after their disposition snugly within holes 13. Such snugness results from the clasping of bushings 14 by undersized holes 13 as the bushings enter the holes and from the clasping of heaters 16 by bushings 14 as hole 13 compress bushings 14 by closing slots 15 therein as the bushings enter the holes.

What is claimed is:
1. In an apparatus adapted to heat, in combination, a heat-conductive flange, a heating element, a heat-conductive tapered annular bushing adapted to receive the heating element interiorly, means defining a longitudinal slot in the bushing, and means defining a tapered hole in the heat-conductive flange adapted to receive the bushing and undersized relative thereto.

2. The apparatus of claim 1 wherein the heating element is disposed within the bushing.

3. The apparatus of claim 1 wherein the means defining the hole are in receipt of the bushing.

4. In an apparatus adapted to heat and extrude film-forming materials, in combination, a heat-conductive extruder header flange, a heating element, a heat-conductive tapered annular bushing adapted to receive the heating element interiorly, means defining a longitudinal slot in the bushing, and means defining a tapered hole in the heat-conductive flange adapted to receive the bushing and undersized relative thereto.

5. The apparatus of claim 4 wherein the heating element is disposed within the bushing.

6. The apparatus of claim 4 wherein the means defining the hole are in receipt of the bushing.

7. A heat-conductive tapered annular bushing adapted to receive the heating elements interiorly and means defining a longitudinal slot in the bushing.

References Cited

UNITED STATES PATENTS

| | | | |
|---|---|---|---|
| 2,719,326 | 10/1955 | Dykehouse | 18—30 |
| 3,304,408 | 2/1967 | Finch et al. | 165—180 X |
| 3,335,459 | 8/1967 | Tyrner | 219—523 X |

RICHARD M. WOOD, *Primary Examiner.*

C. L. ALBRITTON, *Assistant Examiner.*